(12) United States Patent
Luo et al.

(10) Patent No.: US 11,875,204 B2
(45) Date of Patent: Jan. 16, 2024

(54) SECTIONAL TYPE CARD FEEDING MECHANISM AND METHOD

(71) Applicant: SHENZHEN CBPM-KEXIN BANKING TECHNOLOGY CO., LTD, Shenzhen (CN)

(72) Inventors: Bei Luo, Shenzhen (CN); Jinjiong Liao, Shenzhen (CN); Jianwen Zhu, Shenzhen (CN); Junqi Li, Shenzhen (CN); Erwei Zhuo, Shenzhen (CN); Jian Huang, Shenzhen (CN)

( * ) Notice: Subject to any disclaimer, the term of this patent is extended or adjusted under 35 U.S.C. 154(b) by 71 days.

(21) Appl. No.: 17/781,857

(22) PCT Filed: Feb. 20, 2021

(86) PCT No.: PCT/CN2021/077119
§ 371 (c)(1),
(2) Date: Jun. 2, 2022

(87) PCT Pub. No.: WO2022/021861
PCT Pub. Date: Feb. 3, 2022

(65) Prior Publication Data
US 2023/0019244 A1    Jan. 19, 2023

(30) Foreign Application Priority Data
Jul. 30, 2020    (CN) .......................... 202010748285.2

(51) Int. Cl.
*G06K 13/08*    (2006.01)
(52) U.S. Cl.
CPC .................... *G06K 13/08* (2013.01)
(58) Field of Classification Search
CPC ...................................... G06K 13/08
USPC ......................................................... 235/475
See application file for complete search history.

(56) References Cited

U.S. PATENT DOCUMENTS

| | | | |
|---|---|---|---|
| 11,267,258 B1* | 3/2022 | Lien | B41J 11/00214 |
| 2020/0247149 A1* | 8/2020 | Snyder | B41J 11/0065 |
| 2021/0101394 A1* | 4/2021 | Woizeschke | G06K 13/063 |

(Continued)

FOREIGN PATENT DOCUMENTS

| | | |
|---|---|---|
| CN | 102180364 A | 9/2011 |
| CN | 106276188 A | 1/2017 |
| CN | 206322199 U | 7/2017 |

(Continued)

OTHER PUBLICATIONS

International search report of PCT/CN2021/077119.

*Primary Examiner* — Allyson N Trail

(57) ABSTRACT

A sectional type card feeding mechanism and method. The mechanism includes: a rear section mechanism including a rear section frame and a rear section belt, the rear section belt being movably connected to the rear section frame in a lengthwise direction of the rear section frame to convey cards; and a front section mechanism including a front section frame which is connected to an end of the rear section frame, the rear section belt driving the cards to be transferred to the front section frame to be discharged. The process of card feeding is divided into two sections. Cards are placed on the rear section belt of the rear section mechanism, and after the rear section belt conveys the cards to one end of the front section frame, the cards are sent to the other end of the front section frame to be discharged.

8 Claims, 6 Drawing Sheets

(56) References Cited

U.S. PATENT DOCUMENTS

2022/0080724 A1* 3/2022 Skoglund ............. B41J 11/0065
2022/0080740 A1* 3/2022 Snyder .................. B41J 2/2139

FOREIGN PATENT DOCUMENTS

| CN | 206634789 U | 11/2017 |
| CN | 109214473 A | 1/2019 |
| CN | 111914957 A | 11/2020 |
| JP | 2000331128 A | 11/2000 |

* cited by examiner

SECTIONAL TYPE CARD FEEDING MECHANISM AND METHOD

CROSS REFERENCE TO RELATED APPLICATION

This application is International Patent Application No. PCT/CN2021/077119, filed on Feb. 20, 2021, which claims priority benefit of Chinese Patent Application No. 202010748285.2, filed on Jul. 30, 2020, and the entire contents of which are incorporated herein by reference.

TECHNICAL FIELD

The present application belongs to the technical field of card manufacturing devices, and particularly relates to a sectional type card feeding mechanism and method.

BACKGROUND

The statements in this part only provide background information related to the disclosure of the present invention, and do not necessarily constitute the prior art.

The existing card production lines, devices for producing customized cards, card sorting devices, etc. all requires batch card feeding apparatuses. For an existing card feeding mechanism, cards need to be placed in a sloped card channel to allow the cards to slide down the channel under their own gravity. For some card feeding mechanisms, when cards are to be provided in place for the first time, an operator needs to place the cards directly by hand at a position about 50 mm in front of a subsequent rotating component (the component is a high-speed rotating mechanism), which is a highly risky operation.

SUMMARY

Technical Problem

In view of the above, it is necessary to provide a sectional type card feeding mechanism and method, aiming at improving the operation safety of card feeding mechanisms.

Solution to the Problem

A sectional type card feeding mechanism includes:
a rear section mechanism including a rear section frame and a rear section belt, the rear section belt being movably connected to the rear section frame in a lengthwise direction of the rear section frame to convey cards; and
a front section mechanism including a front section frame which is connected to an end of the rear section frame, the rear section belt driving the cards to be transferred to the front section frame to be discharged.

Optionally, the front section mechanism further includes a front section belt and a fork, and the front section belt is movably connected to the front section frame in a lengthwise direction of the front section frame;
the fork includes an installation part and an extension part, the installation part being connected to the front section belt, and the extension part being connected to the installation part; and when a card is placed, the extension part is vertical to the front section belt to abut against the card.

Optionally, the front section mechanism further includes a rib plate which is connected to an end, away from the rear section frame, of the front section frame; the fork further includes a torsion spring, the extension part being hinged to the installation part, and the torsion spring being connected between the extension part and the installation part;

when cards are placed for the first time, the extension part of the fork is vertical to the front section belt under a restoring force of the torsion spring to abut against the card; and when the front section belt drives the fork to move to an end of the front section frame, the extension part of the fork is stopped by the rib plate and then rotates relative to the installation part until the extension part retracts to a position below the front section belt.

Optionally, the rear section frame is hinged to the front section frame to adjust an inclination angle of the front section frame, so that the cards move away from the rear section frame under their own gravity.

Optionally, an included angle between the rear section belt of the rear section frame and a horizontal plane is 5-10 degrees.

Optionally, the sectional type card feeding mechanism further includes a card rubbing mechanism, wherein the card rubbing mechanism includes a first card rubbing wheel and a second card rubbing wheel, and the first card rubbing wheel and the second card rubbing wheel are respectively arranged at two sides of an end, opposite the rear section frame, of the front section frame, rotate in opposite directions, and are configured to press cards on the front section belt to deform the cards so as to separate the cards from each other.

Optionally, the card rubbing mechanism further includes a first photoelectric switch and a second photoelectric switch, and the first photoelectric switch and the second photoelectric switch are respectively arranged at the two sides of the end, opposite to the rear section frame, of the front section frame and each have a light path extending toward the front section belt; and when either the first photoelectric switch or the second photoelectric switch is triggered, the first card rubbing wheel corresponding to the first photoelectric switch or the second card rubbing wheel corresponding to the second photoelectric switch stops rotating to keep the cards in position.

Optionally, the sectional type card feeding mechanism further includes a limit photoelectric switch configured to be triggered when an inclination height of the cards is less than a preset value, so as to cause supplementary cards to be fed to the front section frame.

A sectional type card feeding method includes:
receiving and conveying cards by a rear section belt of a rear section mechanism to a front section frame of a front section mechanism; and
discharging the received cards through an end, away from the rear section mechanism, of the front section frame.

Optionally, before conveying the cards to the front section frame of the front section mechanism, the method further includes: driving a fork by a front section belt to move to a position near an end, close to the rear section belt, of the front section frame; and
receiving cards by the rear section belt of the rear section mechanism includes: placing the cards against the fork and obliquely on the rear section belt; and
discharging the received cards through an end, away from the rear section mechanism, of the front section frame includes:
stopping an extension part of the fork by a rib plate of the front section mechanism, such that the extension part rotates relative to an installation part of the fork until the extension part retracts to a position below the front section belt;

pressing the cards with a first card rubbing wheel and a second card rubbing wheel of a card rubbing mechanism, such that the cards are deformed and separated from each other; and once the cards trigger a first photoelectric switch or a second photoelectric switch, stopping rotation of the first card rubbing wheel corresponding to the first photoelectric switch or the second card rubbing wheel corresponding to the second photoelectric switch to keep the cards in position, so that the cards can be removed easily.

Beneficial Effects

Compared with the related art, the sectional type card feeding mechanism and method feature a sectional manner for card feeding. In the card production, the process of card feeding is divided into two sections. During operation, cards are placed on the rear section belt of the rear section mechanism, and after the rear section belt conveys the cards to one end of the front section frame, the cards are sent to the other end of the front section frame to be discharged. The front section mechanism and the rear section mechanism interact to ensure the safety of card placing operation.

BRIEF DESCRIPTION OF DRAWINGS

In order to illustrate more clearly technical schemes in embodiments of the present invention or the related art, the accompanying drawings used in description of the embodiments will be briefly described below, and obviously, the accompanying drawings in the following description show only some embodiments of the present invention, and for those of ordinary skill in the art, other drawings can be derived on the basis of these drawings without any inventive effort.

LIST OF REFERENCE NUMERALS OF MAIN ELEMENTS

Figure 1:
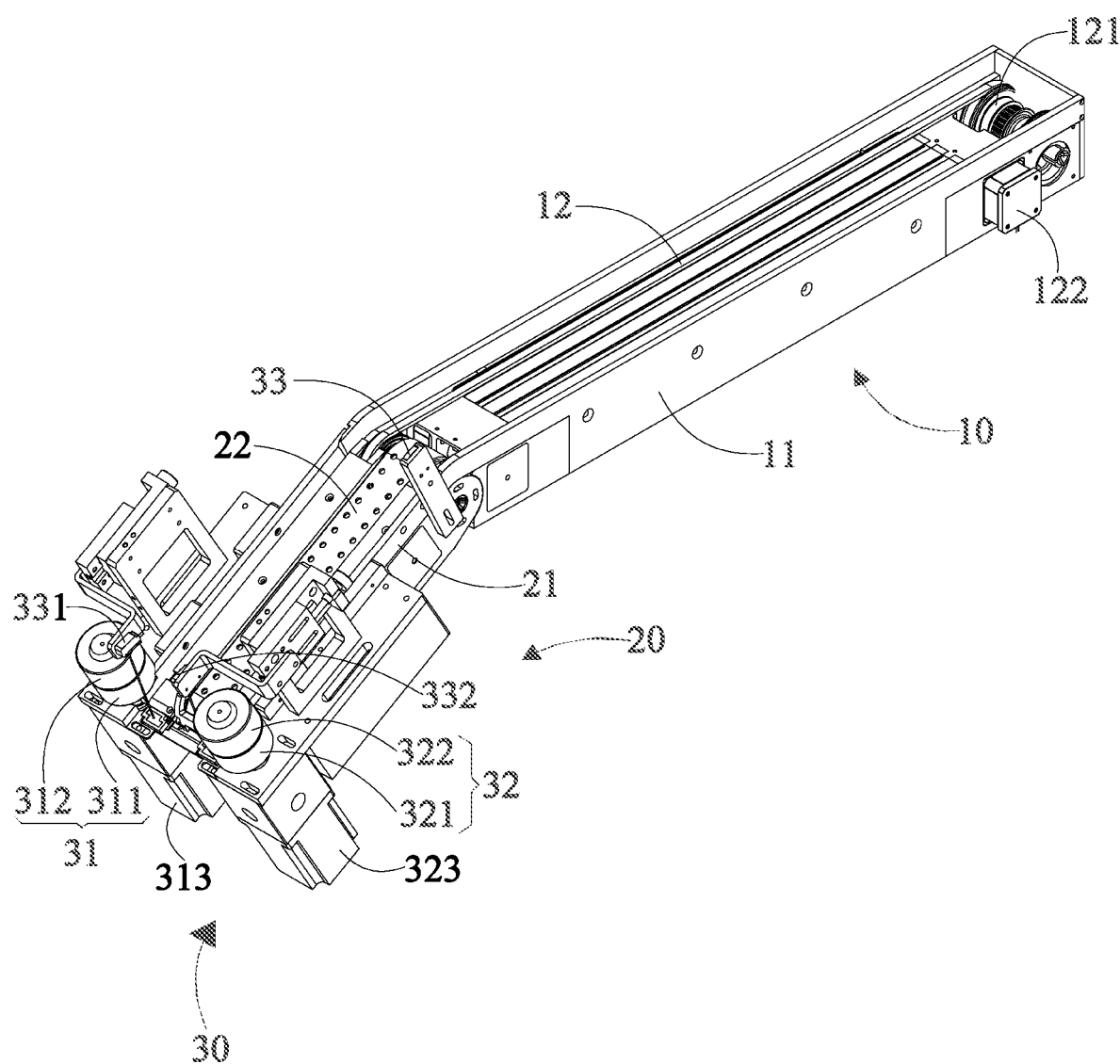
FIG. 1 is a three-dimensional schematic diagram of a sectional type card feeding mechanism.

Rear section mechanism 10; Rear section frame 11; Rear section belt 12; Driving wheel 121; Driving motor 122; Front section mechanism 20; Front section frame 21; Front section belt 22; Rib plate 23; Fork 24; Extension part 241; Installation part 242; Torsion spring 243; Card rubbing mechanism 30; First card rubbing wheel 31; First upper card rubbing wheel 311; First lower card rubbing wheel 312; First card rubbing motor 313; Second card rubbing wheel 32; Second upper card rubbing wheel 321; Second lower card rubbing wheel 322; Second card rubbing motor 323; Limit photoelectric switch 33; First photoelectric switch 331; Second photoelectric switch 332; Card 40.

The present invention will be further explained by the following detailed description in conjunction with the aforementioned drawings.

DETAILED DESCRIPTION

In order to better understand the above objects, features and advantages of the present disclosure, the present disclosure will be further described in detail with reference to the drawings and specific embodiments. It should be noted that combinations of the embodiments and features of the embodiments of the present application without conflict are possible. In the following description, numerous specific details are set forth to facilitate full understanding of the present invention. The embodiments described herein are only some of and not all embodiments of the present disclosure. All other embodiments obtained by those of ordinary skill in the art based on the embodiments disclosed without inventive effort are within the scope of the present invention.

Unless otherwise defined, all the technical and scientific terms used herein have the same meanings as those commonly understood by those skilled in the art. The terms used in the specification are only for the purpose of describing specific embodiments, and are not intended to limit the present application.

In the embodiments, for convenience of description rather than for limitation, the term "connection" used in the specification and claims of the present application is not limited to physical or mechanical connection, but may include electrical connection, whether direct or indirect; and terms like "upper", "lower", "below", "left" and "right" are only used for indicating the relative positional relationship, which changes with the absolute position of a described object.

Figure 2:
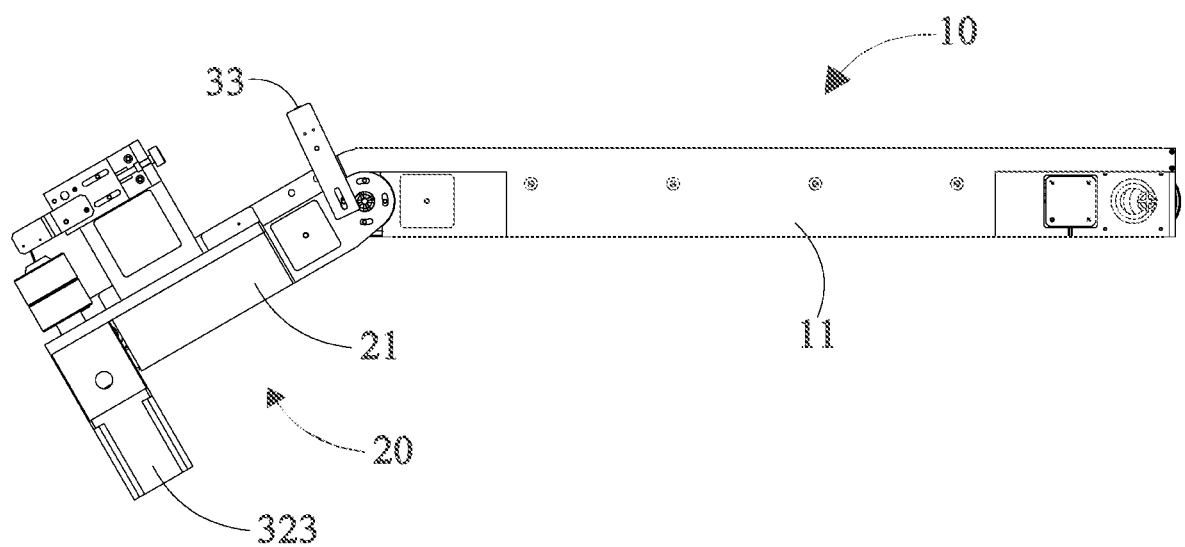
FIG. 2 is a side view of the sectional type card feeding mechanism.

FIG. 1 is a three-dimensional schematic diagram of a sectional type card feeding mechanism, and FIG. 2 is a side view of the sectional type card feeding mechanism. As shown in FIGS. 1 and 2, the sectional type card feeding mechanism includes a rear section mechanism 10, a front section mechanism 20 and a card rubbing mechanism 30. Cards 40 are put in the rear section mechanism 10 and conveyed to the front section mechanism 20 by the rear section mechanism 10. The position of the cards 40 is controlled by the card rubbing mechanism 30 at an end, away from the rear section mechanism 10, of the front section mechanism 20, so as to discharge the cards 40 and realize the conveyance of the cards 40. Here, the cards 40 may be bank cards or ID cards.

The rear section mechanism 10 includes a rear section frame 11 and a rear section belt 12. The rear section frame 11 is of a rectangular frame structure with a lengthwise direction generally extending in a horizontal direction, and a top face of the rear section frame is provided with an open channel extending in the lengthwise direction, so that the cards 40 can be inserted in the open channel, which facilitates the placing of the cards 40. The rear section belt 12 is movably connected to the rear section frame 11 in the lengthwise direction of the rear section frame 11 to convey the cards 40. Specifically, the rear section belt 12 is arranged on a bottom face of the open channel. After the cards 40 are placed in the open channel, the rear section belt 12 can support the bottom of the cards 40. When moving in the lengthwise direction of the rear section frame 11, the rear section belt 12 can drive the cards 40 to move toward the front section mechanism 20. In this embodiment, the rear section mechanism 10 further includes a driving wheel 121 and a driving motor 122. The driving wheel 121 is rotatably connected to the rear section frame 11, and the rear section belt 12 is wrapped around the driving wheel 121. The driving motor 122 is connected to the driving wheel 121 to drive the driving wheel 121 to rotate, thus driving the rear section belt 12 to move around the driving wheel 121. In order to make the cards 40 slightly inclined in the open channel, by controlling the position of the rear section frame 11 or the driving wheel 121, a certain inclination angle is formed between the rear section belt 12 and a horizontal plane, which is preferably 5-10 degrees, such that the cards 40 are inclined toward the front section mechanism 20 in the open channel.

Figure 3:
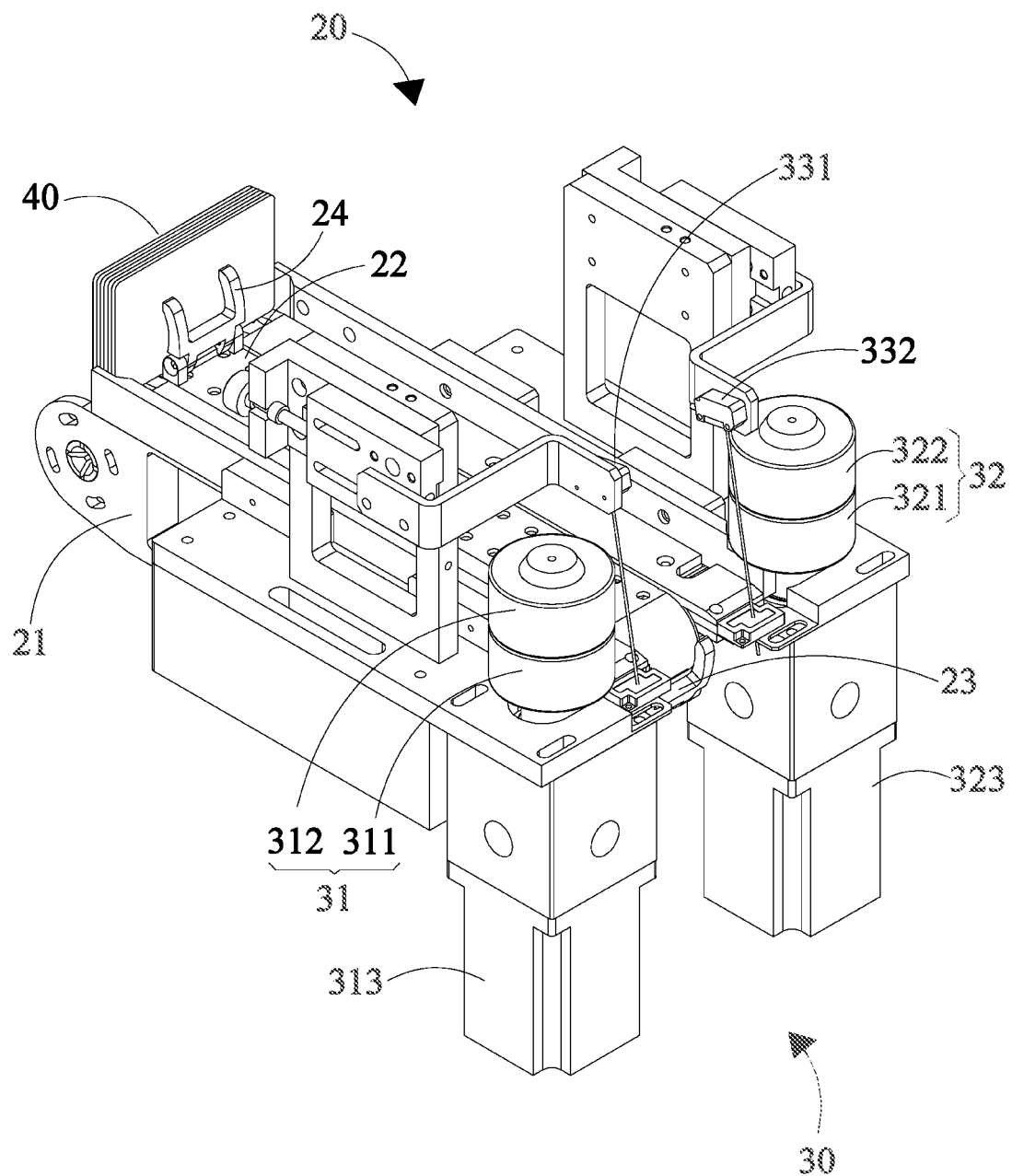
FIG. 3 is a schematic diagram of a front section mechanism when moving cards.
Figure 4:
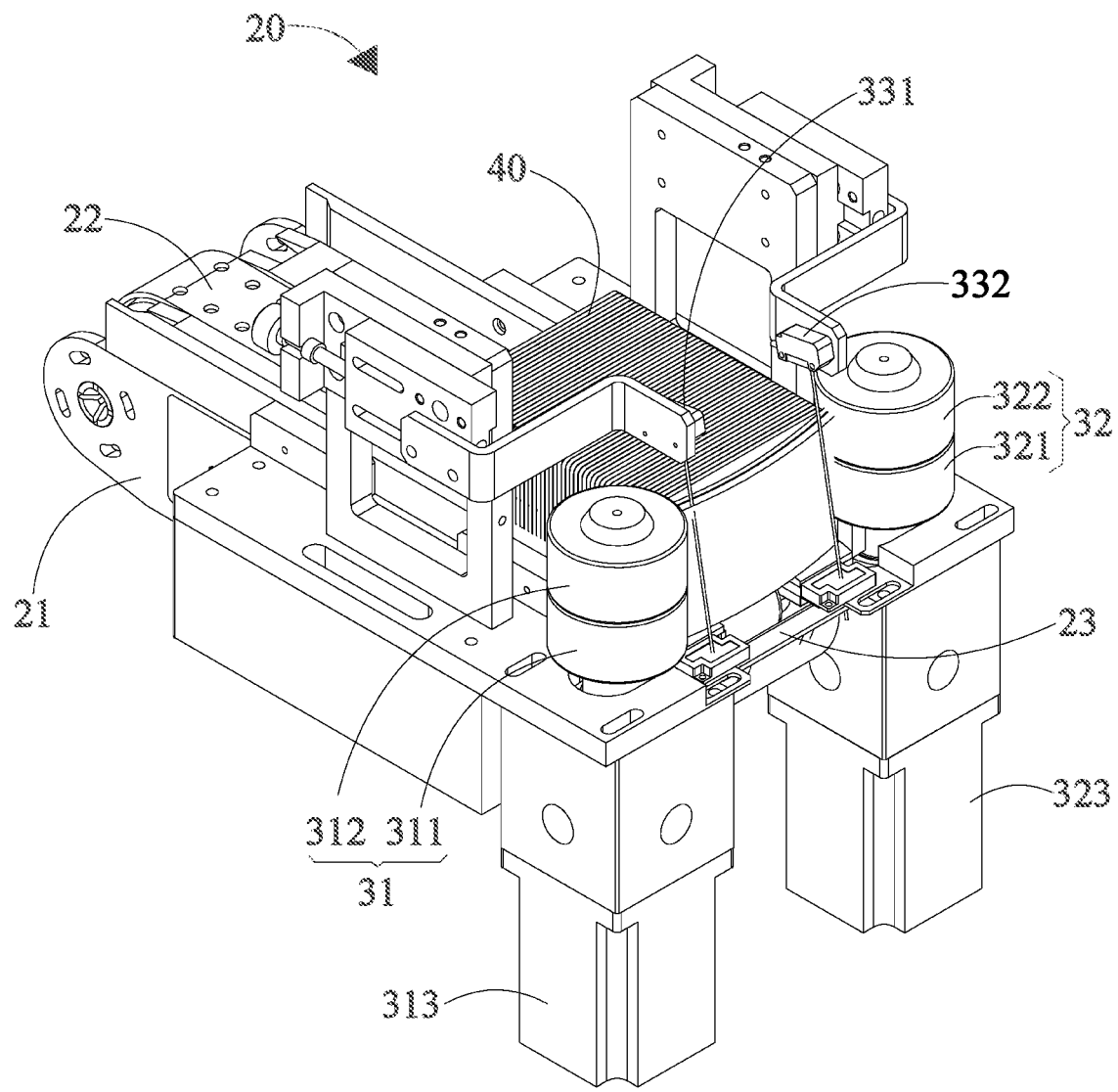
FIG. 4 is a schematic diagram of a front section mechanism when cards are held in position.

FIG. 3 is a schematic diagram of the front section mechanism 20 when moving the cards 40. FIG. 4 is a schematic diagram of the front section mechanism 20 when the cards 40 are held in position. As shown in FIGS. 3 and 4, the front section mechanism 20 includes a front section frame 21, a front section belt 22 and a fork 24. The front section frame 21 is of a rectangular frame structure in general, and a top face of the front section frame is provided with an open channel extending in a lengthwise direction, so that the received cards 40 can be inserted in the open channel, which facilitates the conveyance of the cards 40. In this embodiment, an end of the front section frame 21 is hinged to an end of the rear section frame 11, so that the front section frame 21 can rotate relative to the rear section frame 11; in this way, an angle between the front section frame 21 and the rear section frame 11 can be adjusted, and an inclination angle of the front section frame 21 can be adjusted, so that the cards 40 can move in the lengthwise direction of the front section frame 21 under their own gravity and the push of the rear section frame 10. In addition, a total length of the sectional type card feeding mechanism can be reduced, and the installation and maintenance of the sectional type card feeding mechanism are facilitated.

The front section belt 22 is movably connected to the front section frame 21 in the lengthwise direction of the front section frame 21 to drive the fork 24 to move. Specifically, the front section belt 22 is arranged on the bottom face of the open channel, and after the cards 40 are sent to the open channel, the front section belt 22 supports the bottom of the cards 40. The front section belt 22 is driven in a similar way to the rear section belt 12, and can also be driven by a pulley and a motor, which will not be described in further detail here.

Figure 5:
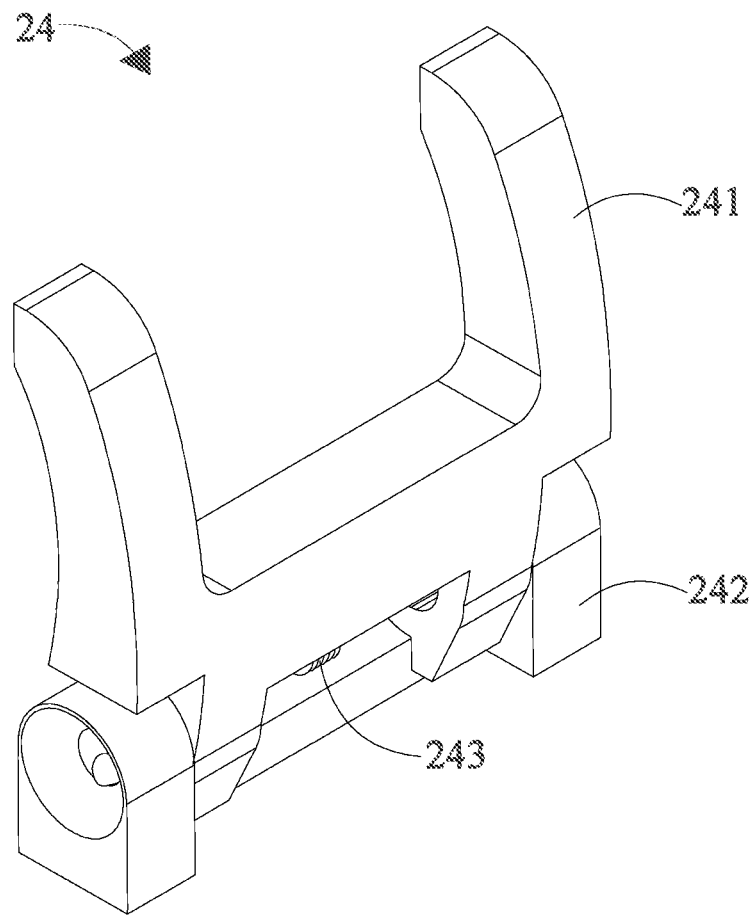
FIG. 5 is a schematic diagram of a fork.

FIG. 5 is a schematic diagram of the fork 24. As shown in FIG. 5, the fork 24 includes an installation part 242, an extension part 241, and a torsion spring 243. The installation part 242 is fixedly connected to a side of the front section belt 22 facing the open channel of the front section frame 21, so as to follow the front section belt 22 to move in the lengthwise direction of the front section frame 21. The extension part 241 is of a Y-shaped structure in general with a bottom hinged to the installation part 242, such that the extension part 241 can rotate relative to the installation part 242 in a vertical plane where the front section belt 22 moves. The torsion spring 243 is installed between the extension part 241 and the installation part 242. In a natural state, the extension part 241 is vertical to the front section belt 22 under an elastic force of the torsion spring 243. When the cards 40 are placed for the first time, the front section belt 22 drives the fork 24 to move to the end near the rear section frame 11, and the extension part 241 is vertical to the front section belt 22 to abut against the cards 40, so that the cards 40 can be placed obliquely on the rear section belt 12.

In addition, an end, away from the rear section frame 11, of the front section frame 21 is provided with a rib plate 23, which extends in a widthwise direction of the front section frame 21, and there is a gap between the rib plate 23 and the front section belt 22. When the front section belt 22 drives the fork 24 to move to the end of the front section frame 21, the extension part 241 of the fork 24 is stopped by the rib plate 23 and then rotates relative to the installation part 242 until the extension part 241 retracts to a position below the front section belt 22, so as not to prevent the cards 40 from being discharged through the end of the front section frame 21.

The card rubbing mechanism 30 includes a first card rubbing wheel 31 and a second card rubbing wheel 32. The first card rubbing wheel 31 includes a first upper card rubbing wheel 311 and a first lower card rubbing wheel 312. The first upper card rubbing wheel 311 and the first lower card rubbing wheel 312 are connected to a first card rubbing motor 313 through a driving shaft, and rotate on their own axes under the driving of the first card rubbing motor 313. Similarly, the second card rubbing wheel 32 includes a second upper card rubbing wheel 321 and a second lower card rubbing wheel 322, and the second upper card rubbing wheel 321 and the second lower card rubbing wheel 322 are connected to a second card rubbing motor 323 through a driving shaft, and rotate on their own axes under the driving of the second card rubbing motor 323. The first card rubbing wheel 31 and the second card rubbing wheel 32 are rotatably arranged at two sides of an end, opposite the rear section frame 11, of the front section frame 21, respectively, and a width between the first card rubbing wheel 31 and the second card rubbing wheel 32 is smaller than a width or length (depending on a placement orientation of the card 40, length if a long side is placed on the front section belt 22, and width if a wide side is placed on the front section belt 22) of the card 40, preferably smaller than 2 mm. Rotation directions of the first card rubbing wheel 31 and the second card rubbing wheel 32 are opposite, so that when the cards 40 pass through the card rubbing mechanism 30, the first card rubbing wheel 31 and the second card rubbing wheel 32 press the cards 40, so that the cards 40 are deformed and separated from other cards 40, thus preventing the cards 40 from sticking to each other.

In this embodiment, the sectional type card feeding mechanism further includes a limit photoelectric switch 33, a first photoelectric switch 331 and a second photoelectric switch 332. The limit photoelectric switch 33 is located along the front section frame 21 or the rear section frame 11, with an emitting direction extending in a widthwise direction of the front section frame 21 or the rear section frame 11 to detect an inclination height of the cards 40 on the front section belt 22, wherein the inclination height refers to a vertical height of the card 40 in an inclined state with respect to the bottom face. In this embodiment, the limit photoelectric switch 33 is preferably arranged at the end, near the rear section frame 11, of the front section frame 21. In the process of discharging the cards 40 near the front section frame 21, if the rear section belt 12 fails to supply new cards 40 in time, an inclination angle of the cards 40 will decrease, resulting in a decrease in the inclination height of the card 40. When the inclination height of the cards 40 decreases to a height that triggers the limit photoelectric switch 33 (for example, the cards 40 no longer block the limit photoelectric switch 33), the limit photoelectric switch 33 can trigger an alert to require new cards 40 to be put in or start the rear section belt 12 to convey the cards 40 to supply more cards 40 to the front section frame 21, such that the inclination angle of the cards 40 increases until the inclination height reaches a preset height again (that is, a height enough to block the limit photoelectric switch 33).

The first photoelectric switch 331 and the second photoelectric switch 332 are respectively arranged at the two sides of the end, opposite the rear section frame 11, of the front section frame 21 and each have a light path extending toward the front section belt 22. To facilitate installation and adjustment, the first photoelectric switch 331 and the second photoelectric switch 332 are movably connected to the front section frame 21 in the lengthwise direction of the front section frame 21, so that the positions of the first photoelectric switch 331 and the second photoelectric switch 332 can be easily adjusted. The positions of the first photoelectric switch 331 and the second photoelectric switch 332 are set in such a manner that at least one of the first photoelectric switch 331 and the second photoelectric switch 332 will be triggered when the cards 40 are pressed and deformed by the first card rubbing wheel 31 and the second card rubbing wheel 32. In this case, the first card rubbing wheel 31 corresponding to the first photoelectric switch 331 and the second card rubbing wheel 32 corresponding to the second photoelectric switch 332 are controlled to stop rotating and be in a braking state to control the position and state of the cards 40, that is: when a card 40 triggers the first photoelectric switch 331, the first card rubbing wheel 31 is correspondingly controlled to stop rotating, and when the card 40 triggers the second photoelectric switch 332, the second card rubbing wheel 32 is correspondingly controlled to stop rotating; and the position of the card 40 can be maintained by maintaining the position of the first card rubbing wheel 31 and/or the second card rubbing wheel 32, so that the card 40 can be discharged.

Figure 6:
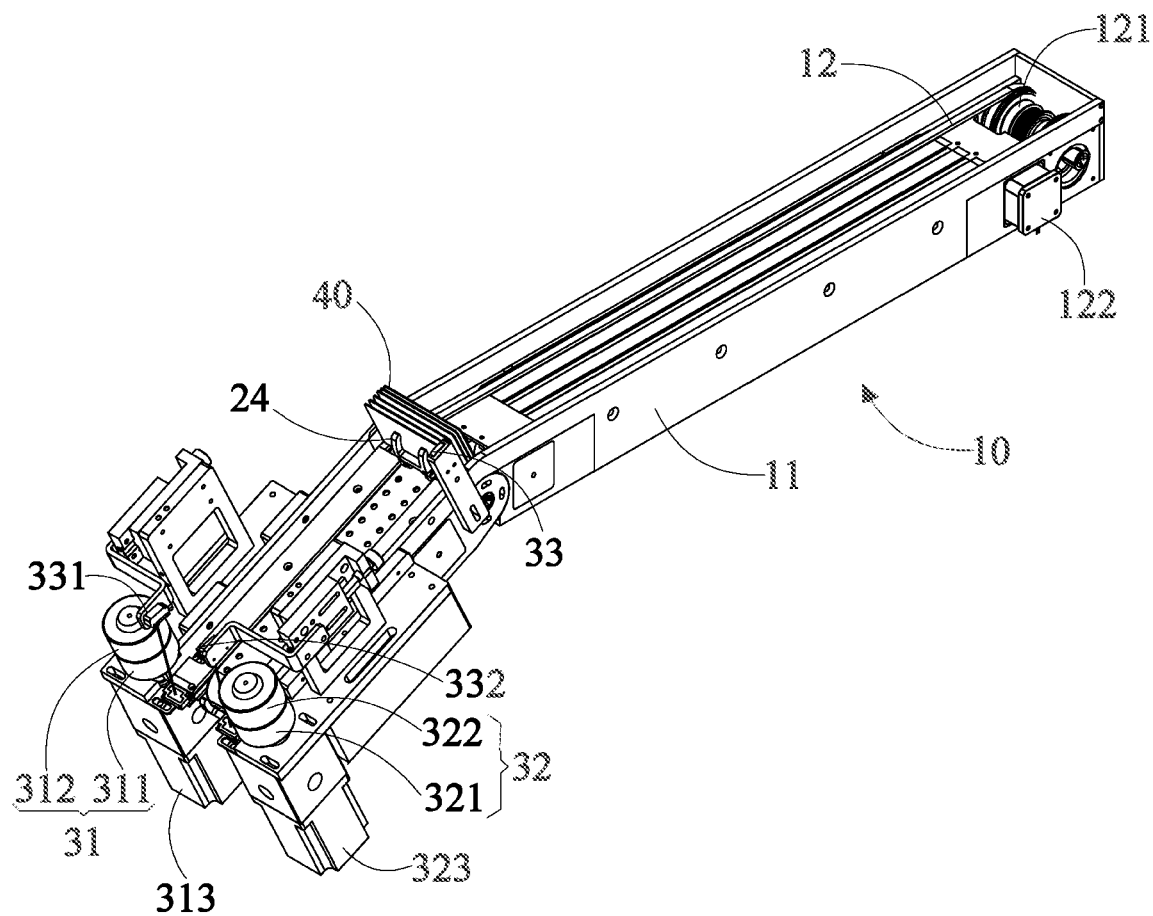
FIG. 6 is a schematic diagram of a sectional type card feeding mechanism with cards to be fed.

FIG. 6 is a schematic diagram of a sectional type card feeding mechanism with cards ready to be fed. A card feeding method of the sectional type card feeding mechanism will be described in detail below with reference to FIGS. 3, 4 and 6.

As shown in FIG. 6, when the cards 40 are loaded for the first time, the front section belt 22 is controlled to move so that the fork 24 is moved to a position near the end of the rear section frame 11 (i.e., a safe position). At this point, the fork 24 is vertical to the front section belt 22. An operator can load the cards 40 on the rear section belt 12 of the rear section frame 11. Because a certain inclination angle exists between the rear section belt 12 and a horizontal plane, the cards 40 can lean against the fork 24 obliquely in turn until a predetermined number of cards 40 are put in with one on top of another.

Then, according to actual needs, the front section belt 22 and the rear section belt 12 are started, and the cards 40 enter the front section belt 22 under their own gravity and the driving of the rear section belt 12, and move toward the card rubbing mechanism 30. During movement, the fork 24 is still in a vertical state to support the card 40, so that the card is in an inclined state on the front section belt 22.

Finally, when the fork 24 is moved to a position near the end of the card rubbing mechanism 30, the cards 40 are held in position (as shown in FIG. 4). At this point, the extension part 241 of the fork 24 is stopped by the rib plate 23, and the extension part 241 rotates relative to the installation part 242 during the movement of the installation part 242 along with the front section belt 22 until the extension part 241 retracts to a position below the front section belt 22 (i.e., to a bottom of the front section frame 21), so that the cards 40 will not be stopped from being discharged through the end of the front section frame 21.

When a card 40 moves to the card rubbing mechanism 30, the first card rubbing wheel 31 and the second card rubbing wheel 32 of the card rubbing mechanism 30 press the card 40, so that the card 40 is deformed and separated from an adjacent card 40. At this point, the card 40 triggers either the first photoelectric switch 331 or the second photoelectric switch 332, so that the first card rubbing wheel 31 stops rotating and remains stationary, or the second card rubbing wheel 32 stops rotating and remains stationary, so as to control the position and state of the card 40, which allows other mechanisms (e.g., a suction mechanism, a mechanical gripper, etc.) to take the card 40 away easily, thus realizing the card feeding function.

During the card feeding process, the limit photoelectric switch 33 monitors whether the inclination height of the cards 40 is greater than the preset height; and if the rear section belt 12 fails to supply new cards 40 in time, the inclination angle of the cards 40 will decrease and the inclination height of the cards 40 is reduced to be lower than the preset height, then the limit photoelectric switch 33 will be triggered, so as to trigger an alert to require new cards 40 to be put in or start the rear section belt 12 to convey additional cards 40, and then the inclination angle of the cards 40 will increase until the inclination height reaches the preset height again.

The sectional type card feeding mechanism and method feature a sectional manner for card feeding. In the production of the cards 40, the process of card feeding is divided into two sections. During operation, the cards 40 are placed on the rear section belt 12 of the rear section mechanism 10, and after the rear section belt 12 conveys the cards 40 to one end of the front section frame 21, the cards 40 are sent to the other end of the front section frame 21 so as to discharge the cards 40. The front section mechanism 20 and the rear section mechanism 10 interact to ensure the safety of card placing operation.

Further, the fork 24 abuts against the cards 40, so that the cards 40 can be loaded from the rear section mechanism 10 when the cards 40 are loaded for the first time, and the cards 40 abut against the fork 24, so that the operation safety of loading the cards 40 for the first time can be improved; and the fork 24 can be hidden below the front section belt 22 after the cards 40 are moved to the card rubbing mechanism 30 without affecting the discharge of the cards 40.

Further, by monitoring the inclination height of the cards 40 with the limit photoelectric switch 33, an operator can be alerted to supply more cards 40 in time or start the rear section belt 12 to drive supplementary cards 40 to move toward the front section mechanism 20, so that additional cards 40 can be supplied in time. The operation is more convenient.

Finally, when the cards 40 move to the card rubbing mechanism 30, the first card rubbing wheel 31 and the second card rubbing wheel 32 press the cards 40 until the cards 40 are deformed and separated from adjacent cards 40, thus preventing the cards 40 from sticking to and scratching each other. After card rubbing is completed, the card 40 triggers the first photoelectric switch 331 and the second photoelectric switch 332, so that the first card rubbing wheel 31 and the second card rubbing wheel 32 stop and remain stationary to control the position of the card 40, so as to discharge the card 40.

In the specific embodiments provided above, it should be understood that it is obvious to those skilled in the art that the present invention is not limited to the details of the above-mentioned exemplary embodiments, and can be implemented in other specific forms without departing from the spirit or essence of the present disclosure. Therefore, from any point of view, the embodiments should be regarded as exemplary and not restrictive. In addition, it is obvious that the word "comprise/include" does not exclude other elements or steps, and words used herein in the singular form does not exclude the plural. Words like "first" and "second" are used for designation and do not indicate any particular order.

The above embodiments are only used to illustrate the technical scheme of the present invention, and not to limit the scope of protection of the present invention. Although the present invention has been described in detail with reference to the preferred embodiments above, those of ordinary skill in the art should understand that modifications and equivalent substitutions can be made to the technical schemes of the present invention without departing from the spirit and scope of the technical scheme of the present disclosure.

What is claimed is:

1. A sectional type card feeding mechanism, comprising:
a rear section mechanism comprising a rear section frame and a rear section belt, the rear section belt being movably connected to the rear section frame in a lengthwise direction of the rear section frame to convey cards; and
a front section mechanism comprising a front section frame which is connected to an end of the rear section frame, the rear section belt driving the cards to be transferred to the front section frame to be discharged;
wherein the front section mechanism further comprises a front section belt and a fork, and the front section belt is movably connected to the front section frame in a lengthwise direction of the front section frame;
the fork comprises an installation part and an extension part, the installation part being connected to the front section belt, and the extension part being connected to the installation part;
and when a card is placed, the extension part is vertical to the front section belt to abut against the card.

2. The sectional type card feeding mechanism of claim 1, wherein the front section mechanism further comprises a rib plate which is connected to an end, away from the rear section frame, of the front section frame; the fork further comprises a torsion spring, the extension part being hinged to the installation part, and the torsion spring being connected between the extension part and the installation part;
when cards are placed for a first time, the extension part of the fork is vertical to the front section belt under a restoring force of the torsion spring to abut against the card; and when the front section belt drives the fork to move to an end of the front section frame, the extension part of the fork is stopped by the rib plate and then rotates relative to the installation part until the extension part retracts to a position below the front section belt.

3. The sectional type card feeding mechanism of claim 1, further comprising a card rubbing mechanism, wherein the card rubbing mechanism comprises a first card rubbing wheel and a second card rubbing wheel, and the first card rubbing wheel and the second card rubbing wheel are respectively arranged at two sides of an end, opposite the rear section frame, of the front section frame, rotate in opposite directions, and are configured to press cards on the front section belt to deform the cards so as to separate the cards from each other.

4. The sectional type card feeding mechanism of claim 3, wherein the card rubbing mechanism further comprises a first photoelectric switch and a second photoelectric switch, and the first photoelectric switch and the second photoelectric switch are respectively arranged at the two sides of the end, opposite to the rear section frame, of the front section frame and each has a light path extending toward the front section belt; and once either of the first photoelectric switch and the second photoelectric switch is triggered, the first card rubbing wheel corresponding to the first photoelectric switch or the second card rubbing wheel corresponding to the second photoelectric switch stops rotating to keep the cards in position.

5. The sectional type card feeding mechanism of claim 4, further comprising a limit photoelectric switch configured to be triggered when an inclination height of the cards is less than a preset value, so as to cause supplementary cards to be fed to the front section frame.

6. A sectional type card feeding mechanism comprising:
a rear section mechanism comprising a rear section frame and a rear section belt, the rear section belt being movably connected to the rear section frame in a lengthwise direction of the rear section frame to convey cards; and
a front section mechanism comprising a front section frame which is connected to an end of the rear section frame, the rear section belt driving the cards to be transferred to the front section frame to be discharged;
wherein the rear section frame is hinged to the front section frame to adjust an inclination angle of the front section frame, so that the cards move away from the rear section frame under their own gravity.

7. The sectional type card feeding mechanism of claim 6, wherein an included angle between the rear section belt of the rear section frame and a horizontal plane is 5-10 degrees.

8. A sectional type card feeding method, comprising:
receiving and conveying cards by a rear section belt of a rear section mechanism to a front section frame of a front section mechanism; and
discharging the received cards through an end, away from the rear section mechanism, of the front section frame;
before conveying the cards to the front section frame of the front section mechanism, the method further comprising: driving a fork by a front section belt to move to a position near an end, close to the rear section belt, of the front section frame; and
wherein receiving cards by the rear section belt of the rear section mechanism comprises: placing the cards against the fork and obliquely on the rear section belt; and
discharging the received cards through an end, away from the rear section mechanism, of the front section frame comprises:
stopping an extension part of the fork by a rib plate of the front section mechanism, such that the extension part rotates relative to an installation part of the fork until the extension part retracts to a position below the front section belt;
pressing the cards with a first card rubbing wheel and a second card rubbing wheel of a card rubbing mechanism, such that the cards are deformed and separated from each other; and
once the cards trigger a first photoelectric switch or a second photoelectric switch, stopping rotation of the first card rubbing wheel corresponding to the first photoelectric switch or the second card rubbing wheel corresponding to the second photoelectric switch to keep the cards in position.

* * * * *